United States Patent [19]

Bonafous

[11] 4,070,002

[45] Jan. 24, 1978

[54] VALVE ACTUATORS

[75] Inventor: Maurice Bonafous, Oloron, France

[73] Assignee: Applications Mecaniques et Robinetterie Industrielle A.M.R.I., Paris, France

[21] Appl. No.: 667,500

[22] Filed: Mar. 17, 1976

[30] Foreign Application Priority Data

Mar. 17, 1975 France .................. 75 08304

[51] Int. Cl.² ............. F16K 31/122; F16K 31/50
[52] U.S. Cl. ................................. 251/58; 74/56; 74/110; 92/130 B; 251/232
[58] Field of Search ............ 74/56, 110; 251/14, 251/57, 58, 229, 251, 261, 262; 92/14, 130 B, 130 C, 143, 25

[56] References Cited

U.S. PATENT DOCUMENTS

| 2,467,020 | 4/1949 | Fischer | 74/110 |
| 2,766,631 | 10/1956 | Van Sittert | 74/110 |
| 3,452,961 | 7/1969 | Forsman | 251/58 |
| 3,463,557 | 8/1969 | Alfieri | 251/229 |
| 3,535,944 | 10/1970 | Newstead | 74/110 |
| 3,595,136 | 7/1971 | Pitt | 92/143 |
| 3,663,115 | 5/1972 | Vindez | 74/110 |
| 3,812,766 | 5/1974 | Weiss | 92/14 |
| 3,889,922 | 6/1975 | Peters | 251/14 |

*Primary Examiner*—Martin P. Schwadron
*Assistant Examiner*—G. L. Walton
*Attorney, Agent, or Firm*—J. Harold Nissen

[57] ABSTRACT

An actuator for a valve in which valve opening and closing is effected via a rectilinearly movable member having, at one end, a driving device and, at its other end, a return-movement arrangement. To-and fro movement of the member under the control of the driving device and return-movement arrangement opens or closes the valve, or vice versa.

The return-movement arrangement includes a ramp connected to the member and a resilient energy storing cushion for acting oppositely to the driving device on the member with a bridging roller transmission rolling contacting the ramp so that, depending on direction of movement of the member, energy is either stored in or dissipated from the cushion.

10 Claims, 8 Drawing Figures

FIG.5
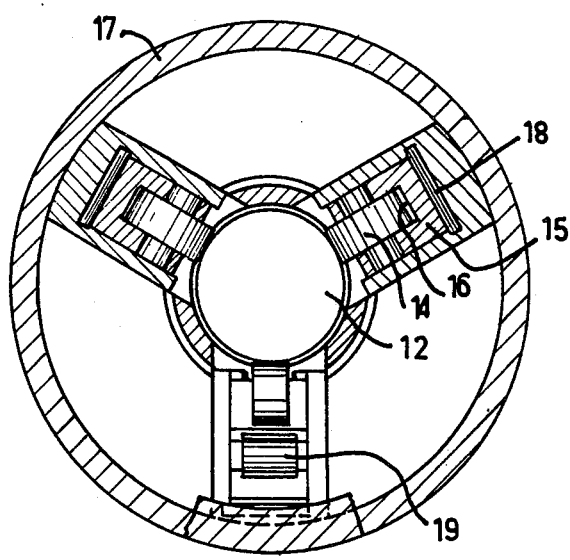
FIG.8      FIG.7      FIG.6
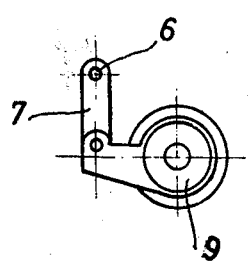 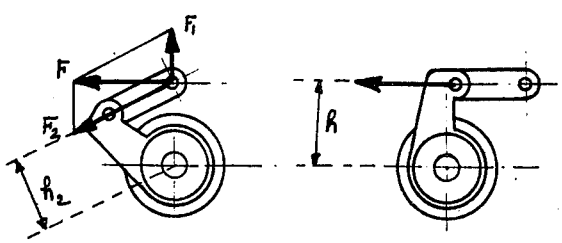

VALVE ACTUATORS

The invention relates to an actuator which may be remotely controlled by mechanical, hydraulic or pneumatic means and returns to its initial position when it is no longer acted upon, providing the process with which it is associated with a pressure and return torque whose modulus varies along the travel depending on the operating principle and law of said process.

It relates more particularly to an actuator using a hydraulic or pneumatic single-acting ram designed for the operation of butterfly valves or the like and which comprises a mechanical device storing energy for the return of the butterfly member and maintaining it in its extreme position when the driving pressure (hydraulic or pneumatic) is less than a certain value.

It is known that actuators of this type must be able to define a very precise closed position, thus determining the seal of the valve and good behaviour of the seat or flexible ring.

They must also be able to transmit to the control shaft of the butterfly member, the necessary torque, with the exclusion of any other force, to provide considerable torque at the time of closing of the valve, to ensure mechanical locking in the closed position and finally, to move the butterfly member as slowly as possible at the time of closing as well as opening, this being in order to make the decrease in the rate of flow regular and to prevent disturbances due to water-hammering at the time of closure.

It is obvious that such characteristics may be obtained in one direction by means of a single-acting hydraulic or pneumatic ram associated with an appropriate transmission and conversion system (rectilinear movement/rotary movement).

On the other hand, it is quite different for operation in the opposite direction of the actuator, in the absence of pneumatic or hydraulic pressure.

In order to facilitate a return to the initial position of the ram and consequently of the valve when said ram is no longer acted upon by a pressure, storage systems have already been produced, comprising springs, for example simple helical springs, which are compressed by the rod of the ram when the latter is subject to a hydraulic control pressure, thus absorbing, in the form of potential energy, part of the energy of the ram and which restore this energy by pushing the rod of the ram back into the initial position, when the latter is no longer moving.

Nevertheless, the use of such return springs does not make it possible to achieve the afore-mentioned properties and this is mainly due to the fact that the transmission and conversion system generally takes into account the fact that the pressure exerted by the rod of the ram is constant throughout its movement.

Consequently, this system is no longer suitable, when, in the absence of control pressure, the actuator returns to its initial position under the effect of the springs which store energy. In fact, it is known that the force exerted by a spring is not constant, but varies depending on its extension. Consequently, if the action of the ram is intended to ensure opening of the valve, the force exerted by the return spring to ensure the closure of the valve will be greater at the beginning of the closing movement than at the time of closure, which is contrary to the objectives.

The object of the invention is to eliminate these drawbacks. It proposes an actuator provided with an energy storage system which is compatible with the transmission and conversion system associated with the rod of the pneumatic or hydraulic ram, in order to obtain, during the return of the actuator to the initial position, in the absence of control pressure, a return force whose value varies depending on the movement of the rod of the ram according to a law appropriate to the objectives.

Consequently, the actuator according to the invention is composed essentially of a driving member, for example a single-acting hydraulic or pneumatic ram, whereof the movable output member having a rectilinear movement (for example the rod of the ram) is integral with a mechanical transmission and conversion system (rectilinear movement/rotary movement) and at its end comprises at least one ramp on which bears and rolls at least one roller subject to the action of a resilient device serving as an energy store such that on the one hand, when the movable output member moves in one direction under the action of a control pressure emanating from the driving member, said ramp pushes the roller against the action of the resilient forces, a movement during which the resilient device stores part of the energy provided by the driving member in the form of potential energy and, on the other hand, in the absence of a control pressure of the driving member, such that this stored potential energy causes the return to the initial position of said output member by action of the roller on said ramp according to a law of variation of force/displacement, depending on the profile of said ramp, this profile consequently being adapted to the type of said transmission and conversion system and due to this, to the final objectives.

According to one method of application of the actuator according to the invention to a butterfly valve whose opening and closure are obtained respectively by a rotation through a quarter of a revolution of the shaft of the butterfly member, the mechanical system for transmission and rectilinear movement/rotary movement conversion may comprise a connecting rod pivoted firstly to a sheave integral with the output member of the actuator and secondly to the end of a lever arm integral with a mandrel fixed on the drive shaft or square of the butterfly member.

This transmission and conversion system advantageously makes it possible to obtain a driving torque on the drive shaft of the butterfly member, which torque, starting from the open position of the valve, increases progressively to the closed position in which it is theoretically infinite and this is for a substantially constant force of the driving member.

Embodiments of the invention will be described hereafter, as non-limiting examples, with reference to the accompanying drawings in which:

FIG. 5 is a section on line A—A of FIGS. 1, 2, 3 and 4.

FIGS. 6, 7, 8 are three diagrammatic sections making it possible to illustrate the principle of the transmission and conversion system used in FIGS. 1, 2, 3 and 4.

Figure 1:
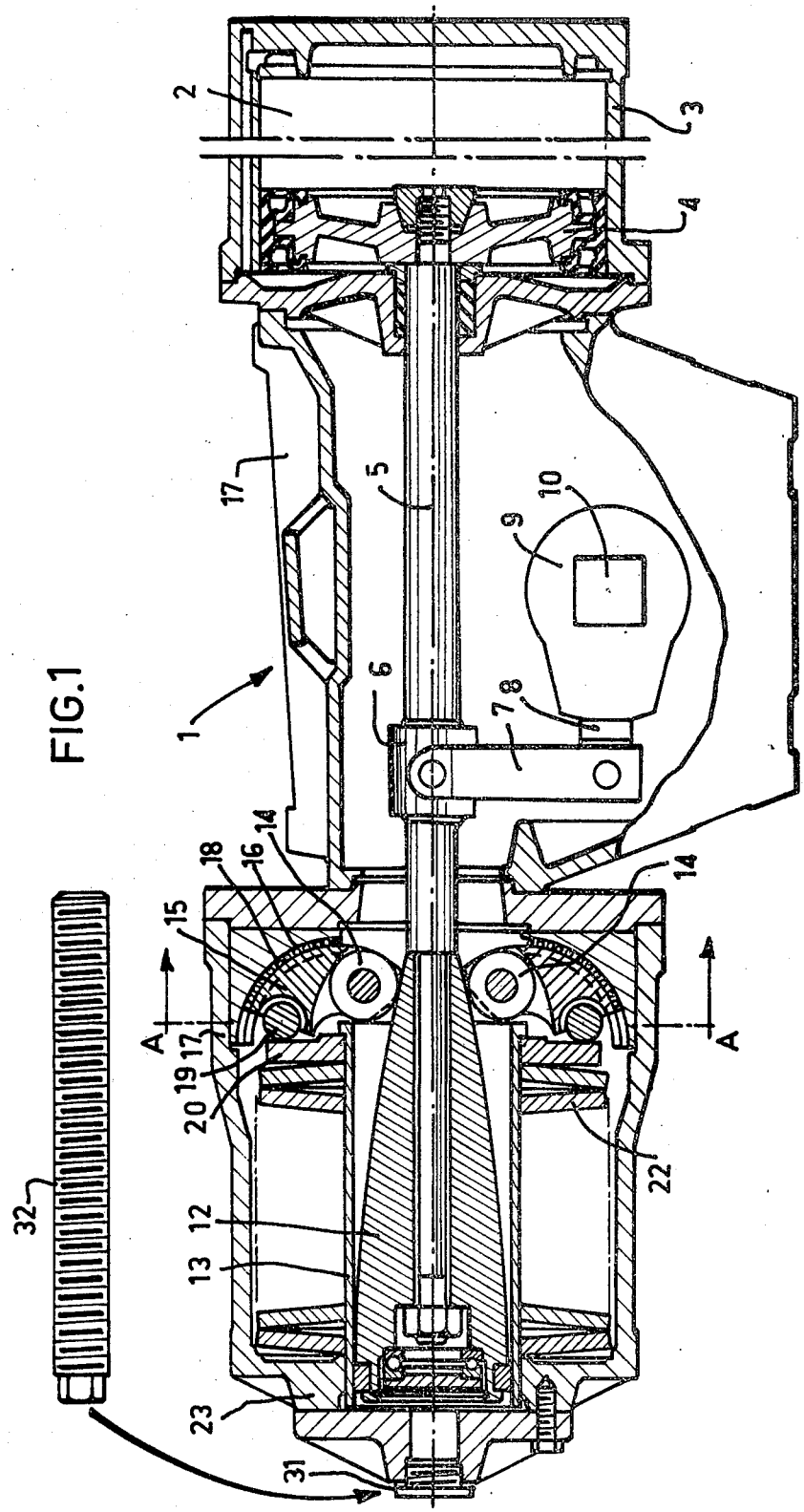
FIGS. 1 and 2 show in longitudinal axial section, an actuator for a butterfly valve equipped with a single-acting pneumatic ram, FIG. 1 corresponding to the closed position of the valve and FIG. 2 to the open position of said valve.
Figure 2:
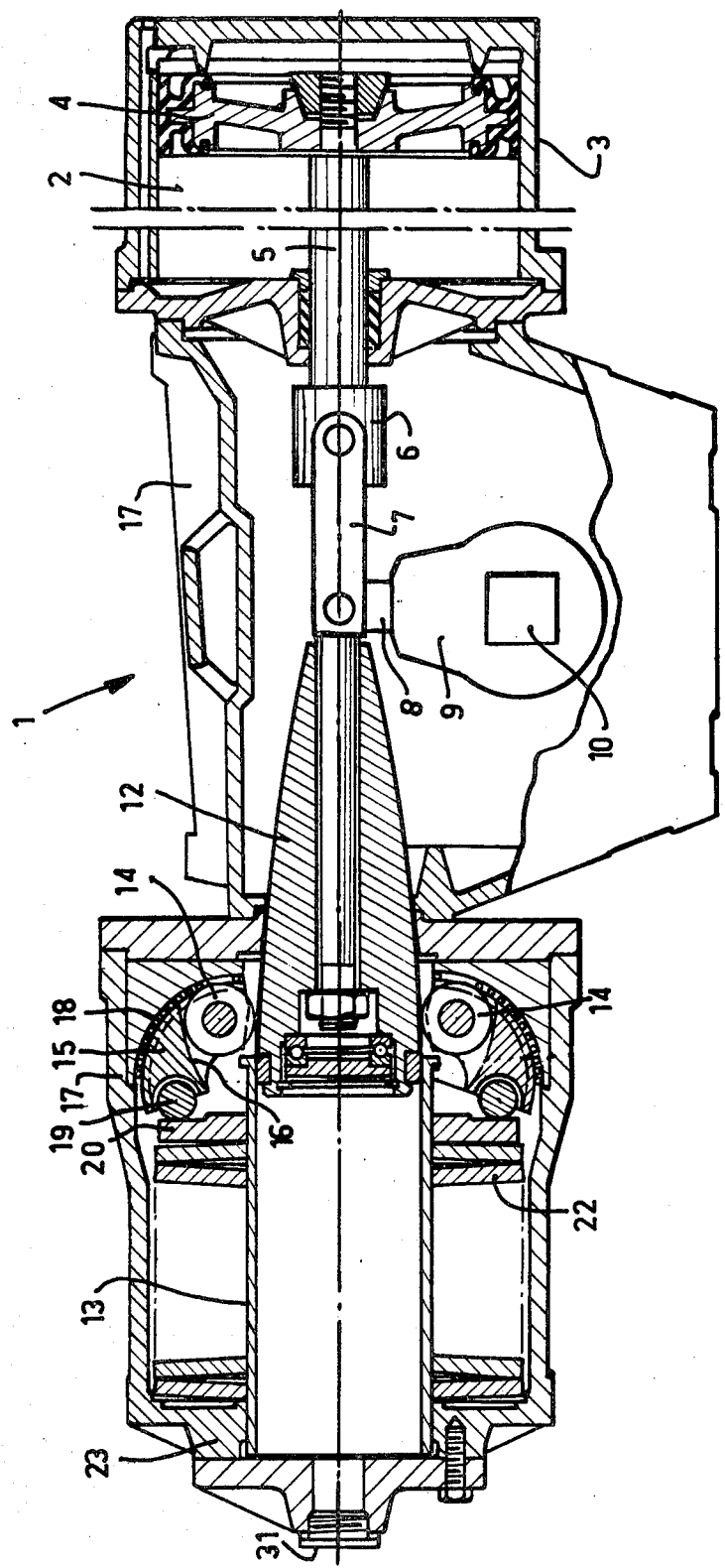

With reference to FIGS. 1, 2 and 5, the actuator 1, comprises a single-acting pneumatic ram 2 comprising, in conventional manner a cylinder 3 and piston 4 integral with a rod 5 moving in a rectilinear manner. In its central part, this rod 5 comprises a hub 6, to which is pivoted a connecting rod 7 in turn pivoted on a lever arm 8 integral with a mandrel 9 fixed to the actuating shaft 10 of a butterfly valve. In this respect, it should be noted that the rod 5 of the ram 2, as well as the parts of the transmission and conversion system, namely the connecting rod 7 and lever arm 8, are located in planes at right-angles to the drive shaft of the butterfly member of said valve.

At its free end, the rod 5 of the ram 2 supports a ramp or pointed cam 12 whereof the end slides in a guiding tube 13 serving to ensure a purely rectilinear movement without any lateral clearance, for said rod 5.

Bearing against the outer surface of the pointed cam 12 are a plurality of rollers 14, which make it possible to transfer to said cam 12, by means of an angular return system, the pressure exerted by a resilient member arranged coaxially to the outer periphery of said guiding tube 13.

In the example illustrated, the return system is composed of a movable member or rocker 15, in the shape of a portion of a ring, having an angle at the centre approximately equal to 90°, whereof the outer peripheral surface bears on the inner peripheral surface, of complementary shape, of an abutment member 16 integral with the body 17 of the actuator 1. To limit the loss of energy due to friction between the movable member or rocker 15 and the abutment member 16, as much as possible, a needle bearing or roller bearing device 18 is disposed between the two said surfaces.

At one end, the movable member 15 supports a pivotally mounted roller 14, which comes into contact with the pointed cam 12 and, on the other side, a roller 19 against which bears a washer 20 sliding on the guide tube 13 and subject to the force of the resilient member. Thus, during movements of the movable member 15, the roller 19 may roll radially on the washer 20.

Similarly, the resilient member is constituted by a pile of resilient washers 22 arranged around the guidance tube 13 between a part 23 of the body 17 of the actuator, serving as an abutment and said washer 20.

Thus, in the case where closure of the valve is obtained by action of the resilient member, in the closed position of the valve (FIG. 1), the rod 5 is "lowered" and the rollers 14 come into contact with the small diameter end of the pointed cam 12. The resilient member is thus partly slackened. To obtain opening of the valve, the ram 2 is pressurised in order to cause the movement of the rod 5. During this movement, the pointed cam 12 pushes back the rollers 14, which, by means of the return system, causes the compression of the resilient member. Thus, part of the energy provided by the ram 2 is stored, in the form of potential energy, by the resilient member. At the end of the opening movement, the rollers 14 are in contact with the large diameter of the cam (FIG. 2).

When the pressure inside the ram 2 is eliminated, the rod 5, which is subject only to said return force, moves in the opposite direction to previously, causing closure of the valve (FIG. 1).

During this displacement, the return force follows a law of variation depending directly, on the one hand, on the nature of the resilient member and, on the other hand, on the profile of the cam 12. Naturally, this law of variation which is transformed by the transfer function of the transmission and conversion system, is established in order to fulfill the opening and closing laws of the valve in an optimum manner.

Figure 3:
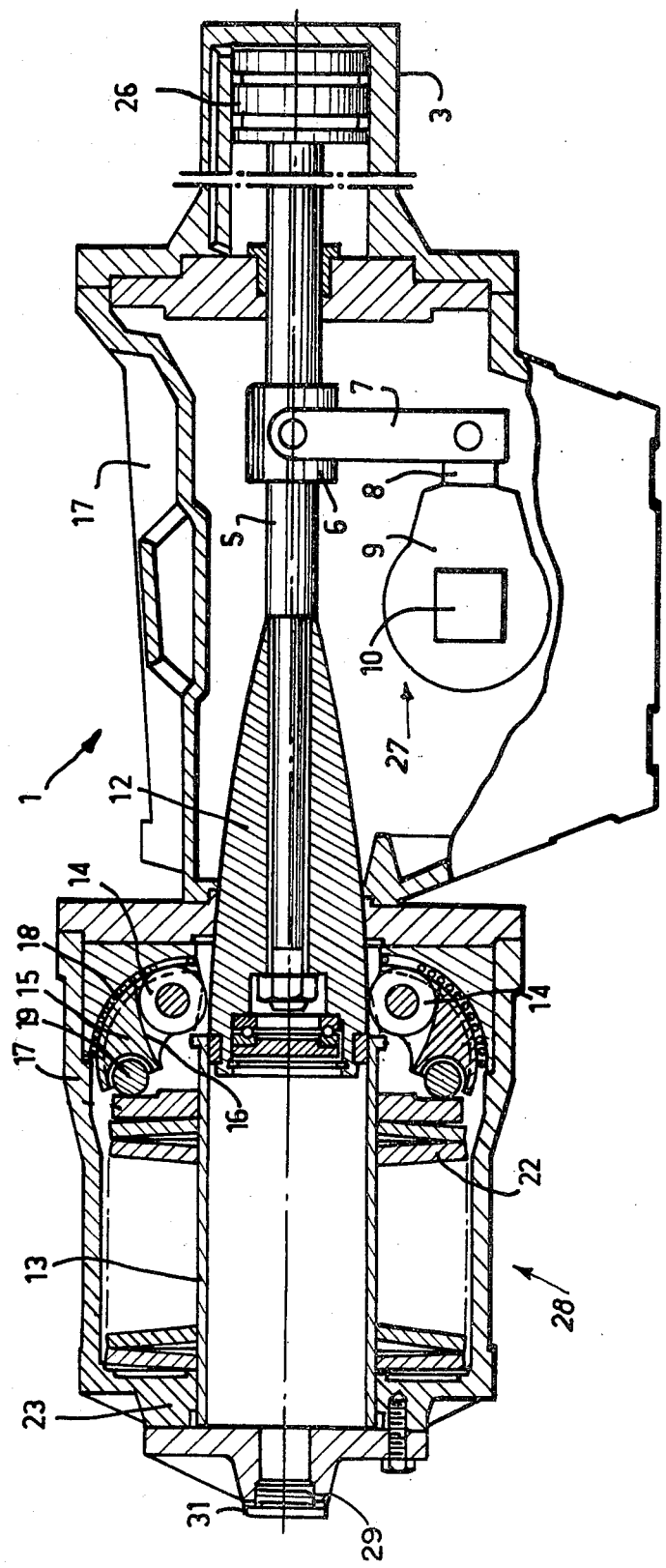
FIGS. 3 and 4 are two longitudinal axial sections similar to those of FIGS. 1 and 2, in which the actuator is provided with a hydraulic ram.
Figure 4:
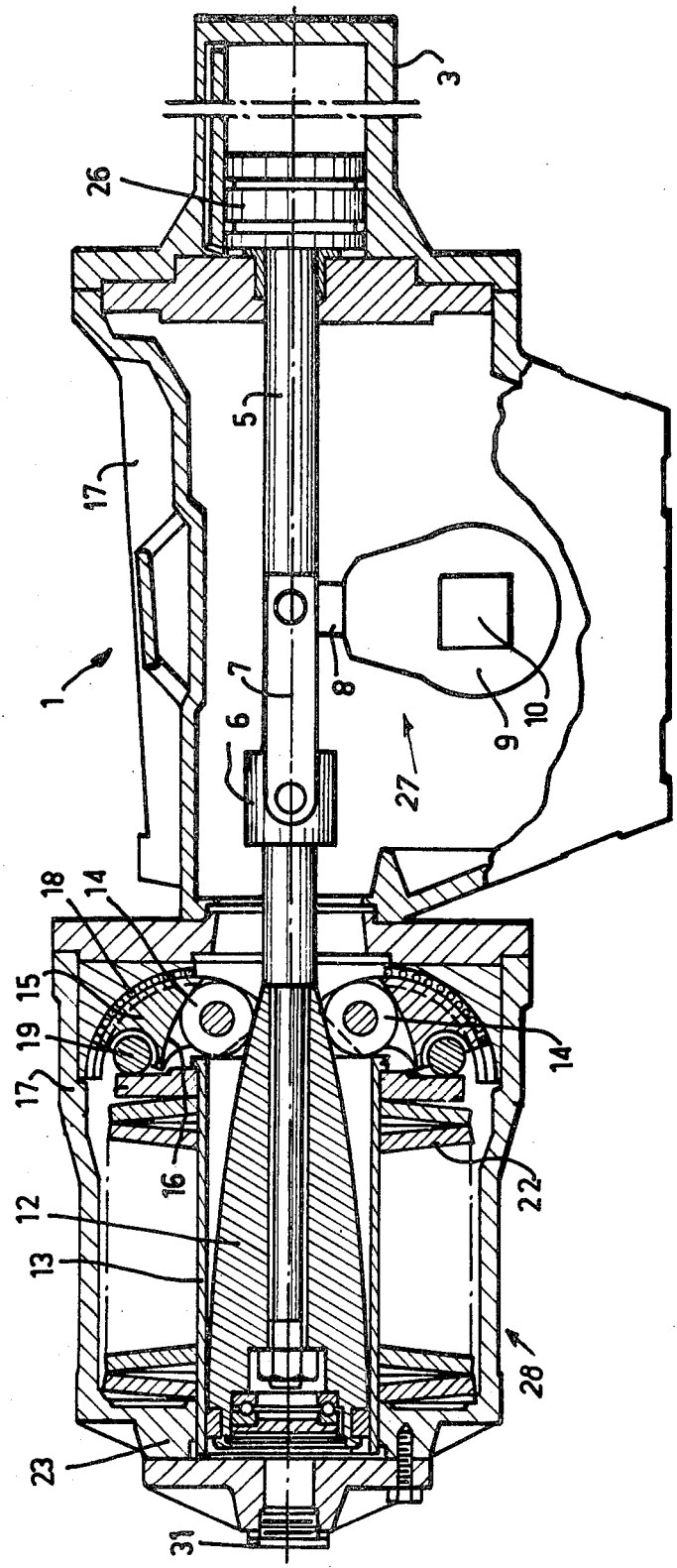

Referring to FIGS. 3 and 4, the actuator, which has a symmetrical arrangement of the transmission and conversion system 27, ensures that the valve returns to the open position, by the energy storing system 28, whereas the closure of the valve is ensured by the action of the ram 26.

In order to facilitate the opening operation in the case where the valve is in the closed position, under the effect of the resilient device (or vice versa) when hydraulic or pneumatic energy is not available, for example in the case of a breakdown of the installation providing or distributing the energy or when starting up the installation, the invention provides an emergency control system.

To this end, a tapped opening 29 coaxial to the rod 5 of the ram and located at the rear of the pointed cam 12 is provided in the body of the actuator.

This opening 29 is normally closed by a stopper 31, which may be removed and replaced when necessary, when the hydraulic or pneumatic energy fails, by a screwthreaded rod 32 which is screwed into the opening 29 and during screwing pushes back the rear of the pointed cam 12, thus replacing the force of the hydraulic or pneumatic pressure which is not available.

FIGS. 6, 7 and 8 make it easier to illustrate the operating principle of the transmission and conversion system used in the actuator shown in FIGS. 1, 2, 3 and 4, and in particular the respective positions assumed by the hub 6, the connecting rod 7 and the mandrel 9 in the opening position (FIG. 6), in the intermediate position (FIG. 7) and in the closed position (FIG. 8) of the valve.

It thus appears that if the hub 6 to which the connecting rod 7 is pivoted, is subject to a constant force, in the opening position shown in FIG. 6, the torque available on the axis of the mandrel satisfies the equation $c = F \cdot h$ ($h$ being the distance of the connecting rod 7 from the axis of the mandrel 9).

During the movement of the hub 6, one firstly notes a slight decrease in the torque C with a slight reduction of the distance $h_2$ (FIG. 7) which is then compensated for by the increase of the component $F_2$ of the force F on the longitudinal axis of the connecting rod 7, this torque then increasing progressively on reaching the closed position illustrated in FIG. 8 where it is theoretically infinite.

The slight decrease in torque in the intermediate position is easily compensated for by an appropriate structure of the profile of the pointed ramp 12.

What is claimed is:

1. An actuator for a valve comprising a rectilinearly movable, motion-transmitting member, a mechanical valve-operating system connected to said member and connectible to a valve, a driving device connected to said member to move same in one direction of valve operation, and a return-movement arrangement connected to said member to move it in an opposite and return direction of valve operation, the arrangement including a ramp connected to the member for movement therewith, a movable resilient energy storing cushion arranged about said ramp for effecting said return movemnt of the member and roller transmission means including a movable arcuate member contiguous with the ramp and operatively associated with the cushion to effect movement thereof for energy storage and dissipation depending on the direction of movement of the output member.

2. An actuator according to claim 1, in which said mechanical transmission system comprises a connecting rod pivoted at one end to the output member and at its other end to the end of a lever arm integral with a bracket, fixed to a drive shaft of the valve.

3. An actuator according to claim 1, in which said ramp consists of a conical cam slidable in a guiding tube forming part of the actuator, the outer surface of said cam having in contact therewith a plurality of rollers of the roller transmission means which make it possible to transfer to said cam the force exerted by the resilient cushion mounted coaxially to the cam.

4. An actuator according to claim 3, in which the resilient cushion is constituted by a pile washers arranged around the guiding tube.

5. An actuator according to claim 3, in which the resilient cushion includes resilient washers arranged around the guiding tube.

6. An actuator according to claim 1, in which said movable arcuate member has an outer peripheral surface which bears on the inner peripheral surface, of an abutment member of complementary shape integral with the actuator, a bearing being interposed between said surfaces.

7. An actuator according to claim 6, in which said movable member or rocker supports, on one side, a roller which bears on the cam and, on the other side, a roller which bears on a washer around said guiding tube and subject to the force exerted by the resilient cushion.

8. An actuator according to claim 1, in which said driving device consists of a hyraulic ram.

9. An actuator according to claim 1, which defines a tapped opening located at one end of and coaxial with said ramp this opening being closable by a removable stopper which may be replaced by a threaded rod which serves as an emergency control and which, during screwing, pushes the cam in a direction to ensure operation of the actuator in the absence of a driving pressure.

10. An actuator according to claim 1, in which said driving device comprises a pneumatic ram.

* * * * *